United States Patent [19]

Ouchi et al.

[11] Patent Number: 4,845,346
[45] Date of Patent: Jul. 4, 1989

[54] TOUCH PANEL HAVING PARALLAX COMPENSATION AND INTERMEDIATE COORDINATE DETERMINATION

[75] Inventors: Junichi Ouchi; Hiroaki Sasaki; Kazuo Hasagawa, all of Furukawa, Japan

[73] Assignee: Alps Electric Co., Ltd., Japan

[21] Appl. No.: 173,674

[22] Filed: Mar. 25, 1988

[30] Foreign Application Priority Data

Jul. 16, 1987 [JP] Japan ................. 62-176016

[51] Int. Cl.⁴ ............................................. G01V 9/04
[52] U.S. Cl. .................................. 250/221; 340/712; 341/31
[58] Field of Search ................. 250/221; 340/712, 555, 340/556; 341/31

[56] References Cited

U.S. PATENT DOCUMENTS 4,672,195  6/1987  Golborne et al. ............... 250/221
4,692,609  9/1987  Pettersson ..................... 250/221
4,766,424  8/1988  Adler et al. ..................... 250/221
4,766,425  8/1988  Tallman et al. .................. 341/31

Primary Examiner—Edward P. Westin
Assistant Examiner—Khaled Shami
Attorney, Agent, or Firm—Guy W. Shoup; Paul J. Winters; Stephen L. Malaska

[57] ABSTRACT

Disclosed is here a coordinate input apparatus in which light sources and light receiving elements opposing thereto with an input operation space therebetween are arranged in an X-axis direction and in an Y-axis direction. The light sources and said light receiving elements form a plurality of pairs and the light sources are sequentially driven to accomplish a scan operation. Coordinates corresponding to the light receiving element of which a light path is interrupted by a coordinate input scan in the input operation space are outputtted as detection signals and as coordinate input data of a position where the light path is interrupted. The apparatus includes a double-precision coordinate calculate unit for calculating, when light paths of two adjacent light receiving elements are simultaneously interrupted, coordinates of an intermediate point associated with coordinates corresponding to the two light receiving elements and a coordiante value correcting unit for achieving a parallax correction on the coordinates calculated by the double-precision calculate unit by use of a correction table.

As an output from the coordinate correcting unit is converted into be coordinates corresponding to the arrangement constituted with the light sources and the light receiving elements so as to be outputted as coordinate input data.

5 Claims, 7 Drawing Sheets

TOUCH PANEL HAVING PARALLAX COMPENSATION AND INTERMEDIATE COORDINATE DETERMINATION

BACKGROUND OF THE INVENTION

1. Field of the Invention

The present invention relates to a coordinate input apparatus in an information processing system, and in particular, to a coordinate input apparatus which detects a position in a two-dimensional space so as to input the position as coordinate data, for example, in a host computer of the information processing system.

2. Description of the Prior Art

The coordinate input apparatuses of this kind include an optical coordinate input apparatus in which photoemitters as light sources and photosensors as light receivers paired with the photoemitters are arranged with an input plane (input operation space) therebetween such that the photoemitters oppose to the photosensors in the X and Y directions and a coordinate input apparatus of an induced voltage method in which a great number of sense lines are arranged in the X and Y directions with respect to the input direction so as to form a matrix thereof, thereby sensing induced voltages appearing in said sense lines. These coordinate input apparatuses are generally called touch input apparatuses or touch panels. (Incidentally, in the case of the optical coordinate input apparatus, the input is supplied through an interruption of the light sources and hence the operation to touch the apparatus need not be necessarily effected.)

In the input apparatuses such as the touch panel, regardless of the type thereof described above, an input space of a finger or a position on the panel is detected as data associated with the X and Y coordinates through an input operation so as to input the coordinate data in the host computer or the like.

In the following paragraphs, description will be particularly given of an example of an optical coordinate input apparatus.

In the optical coordinate input apparatus, as described above, the light sources (photoemitters) and light receiving elements (photosensors) paired therewith are arranged so as to oppose to each other, and according to a counter value delivered from a counter circuit, the light sources are sequenctially driven to effect a scanning operation. In this fashion, a sense signal is produced when a light is not received because a light path is interrupted by a coordinate input operation, for example, through a touch of a finger and the light from a photoemitter does not reach the corresponding photosensor. The counter value associated with the sense signal is detected as an input coordinate data.

The coordinate input apparatus of this kind is employed in various manners, for example, the apparatus is mounted on a CRT face of a CRT unit as a terminal of an information processing system so as to effect an input operation by use of a display on the CRT face as a target, or the apparatus is located on a sheet to effect an input operation by tracing an image on the sheet.

Furthermore, particularly, in a case where the coordinate input apparatus is disposed on a CRT face for the use thereof, there appears a parallax between an image displayed as a target on the face and a panel of the coordinate input apparatus generally made of a flat, transparent material, which leads to a problem that coordinate data other than desired coordinate data is inputted.

FIG. 7 is an explanatory diagram useful to explain an occurrence of a parallax which includes a display unit (for example, a CRT) 100, a coordinate input apparatus 200, a display surface 300 of the display unit (for example, a face of the CRT), a display area 400, positions of an eye 500 and 600, a display area $P_2$-$Q_2'$ on the coordinate input apparatus 200 associated with the eye position 500, and a display area $P_2'$-$Q_2$ on the coordinate input apparatus 200 associated with the eye position 600, In FIG. 7, when the display surface 300 of the display apparatus 100 becomes apart from the coordinate input apparatus 200, particularly when the display surface 300 is a curved surface like the face of a CRT, depending on the position of the eye of the user, there appears a positional unmatching due to a parallax between a position (coordinate point) of the coordinate input apparatus and the display area 400 of the display apparatus. In this figure, for the eye position 500, a display area $P_2$-$Q_2'$ results on the coordinate input apparatus 200, whereas for the eye position 600, a display area $P_2'$-$Q_2$ is attained on the coordinate input apparatus 200.

Consequently, for the eye position 500, point P, in the display area 400 of the display apparatus, namely, point $P_2$ where a line connecting between the eye position 500 and the point $P_1$ intersects the coordinate input apparatus 200 is not attended with a positional difference; consequently, when a coordinate input operation is effected on the point $P_2$ of the display apparatus 200, for example, by touching the point $P_2$ by a finger, th point $P_1$ as a target in the display apparatus 100 can be inputted as correct coordinate data in a host computer or the like. However, when inputting the point $Q_1$ of the display apparatus, the input operation is effected by touching point $Q_2'$ of the display apparatus, namely, point $Q_1'$ apart from the objective point $Q_1$ by a distance of D corresponds thereto, and as a result, wrong data is inputted.

In order to prevent a wrong data input of the coordinate input apparatus due to the parallax, there has been disclosed, for example, a method by the Japanese Patent Laid-Open No. 62-99824 in which a correction table is employed. According to this method, input point coordinates indicated by an input operation and correction values corresponding to a parallax at the input point are stored in an ROM so as to automatically correct a wrong data input due to the parallax of the input coordinate point.

In addition, the Japanese Patent Laid-Open No. 61-208532 discloses a system which employs an ROM table storing the similar correction values and which includes a hierarchic structure where photoemitters and photosensors of a coordinate input apparatus arranged on a display apparatus are located in the proximity of each other on a curved surface of the face of a CRT as the display apparatus.

However, according to the prior art technology described in the publication above, the detection of the input point coordinates of the coordinate input apparatus is effected in the X-Y matrix disposed in a discrete fashion on a two-dimensional space; consequently, the correction table stores predetermined correction values for each group including a plurality of areas on the two-dimensional plane of the coordinate input apparatus, which leads to a problem that defects of coordinates occur on boundaries where the correction values vary.

Next, referring to the drawings, the mechanism of occurrence of the problem will be described.

FIG. 8 is an explanatory diagram useful to explain an example of a parallax correction table, whereas FIG. 9 is an explanatory diagram useful to explain coordinate data corrected by use of the table.

In FIG. 8, reference numerals 0, 1, 2, etc. correspond to positions of the photosensors and $T_{11}, T_{12}, \ldots, T_{21}, T_{22}, \ldots, T_{31}, T_{32}$, etc. indicate respective correction areas.

In this configuration, for example, in the correction area $T_{11}$, when a photosensor X-1 of the X coordinate and a photosensor Y-1 of the Y coordinate are inputted through an input operation (the light sources to the photosensors X−1 and Y−1 are interrupted), the coordinates (1, 1) of the input point are corrected as coordinate input data to be (0, 0) since the correction values are X:−1 and Y:−1, and for the coordinates (1, 6), the correction values are X:−1 and Y:+1 and hence the coordinate input values are corrected and are outputted as (0, 7). Incidentally, when the value after the correction is negative (−), 0 is assumed, whereas when the value exceeds the maximum value in the X or Y direction, the corresponding maximym value in the X or Y direction is assumed.

The coordinate input data thus corrected in the correction procedure are shown in FIG. 9. In this figure, the arrows indicate the correction directions.

In FIG. 9, $S_{11}, S_{12}, \ldots, S_{21}, S_{22}, \ldots, S_{31}, S_{32}$, etc. denote coordinate input data after the correction. As can be seen from this figure, the erroneous input due to the parallax is corrected by the correction above. However, at positions 2 and 7 in the X direction and at positions 2 and 5 in the Y direction as indicated by the arrows A-D, there occur defects of coordinate input data.

That is, for the coordinate input data, at the X coordinates 2 and 7 and at the Y coordinates 2 and 5, data are missing in any cases.

As shown in FIGS. 8-9, in an apparatus in which the coordinate input data is attained according to a physical arrangement of photoemitters and photosensors (to be referred to as a single-precision coordinate input apparatus herebelow), when an input operation is accomplished astriding two adjacent photosensors, for example, X=2 and X=3, the detection is effected at either X=2 or X=3 according to the priority processing; consequently, for X=2, since the table $T_{11}$ of FIG. 8 includes the correction value X:−1, the coordinate input data is assumed to be X=1. On the other hand, for X=3, the correction value in the table $T_{12}$ is X:0 and hence the coordinate input value is X=3 without any alteration.

As a result, the coordinate input data for X=2 is not included as data.

As an improvement of the single-precision coordinate input apparatus having the priority processing, the present applicant has already proposed in the Japanese Patent Application No. 62-62158 an apparatus (to be referred to as a double-precision coordinate input apparatus) in which when an input operation is effected astriding two adjacent photosensors, the intermediate point of the two coordinate values is calculated.

However, also in the double-precision coordinate input apparatus, there occur defects of coordinate input data.

According to the prior art technology described above, in an apparatus in which an error of coordinate input data caused by a parallax of the coordinate input apparatus is corrected by use of a correction table including a plurality of areas established in accordance with relative positions between the coordinate input apparatus and the display apparatus, there has been a problem that depending on a difference between the correction values in areas of the correction table, there occur defects of coordinate input data on area boundaries.

SUMMARY OF THE INVENTION

It is therefore an object of the present invention to provide a coordinate input apparatus which removes the defects of the coordinate input data also on boundaries of areas of the correction table, thereby solving the problems of the prior art technology.

The problems above can be solved as follows. Namely, coordinate values are also set at intermediate points of the respective photosensors, and there are disposed means (double-precision calculate means) for calculating the coordinates of an intermediate point when a plurality of photosensors are detected for an input as a result of an input operation and means for correcting the coordinate values thus calculated for the intermediate point, thereby dividing the corrected coordinate values by two so as to output the results as the single-precision coordinate data.

Referring now to FIGS. 5-6, a description will be given of the principle of the present invention.

FIG. 5 is an explanatory diagram useful to explain an example of the correction table according to the present invention in which the digits in the parentheses indicated in the X and Y directions are the coordinates corresponding to the single-precision data of the conventional example of FIG. 8, whereas the digits not enclosed in the parentheses indicate coordinates including intermediate points established according to the double-precision calculation.

In the figure, the correction values (in the double precision) associated with the parallax between the display apparatus and the coordinate input apparatus are beforehand stored in the form of the correction table in an ROM such that a correction area $T_{11}'$ with X:−2, Y:−2, a correction area $T_{12}'$ with X:0, Y:−2, and so forth.

FIG. 6 is an explanatory diagram useful to explain the results of the correction achieved by use of the correction tble of FIG. 5 in which ● indicates detection coordinates in the single precision, namely, physical detection coordinates and ○ represents intermediate-point coordinates attained by the double-precision computation.

In FIGS. 5-6, in the coordinate input apparatus, the operation is achieved according to the physical configuration of detecting devices of the coordinate input apparatus, namely, in an optical coordinate input apparatus, the operation is effected by interrupting at least one light beam in an input space comprising a matrix of light beams linking photoemitters and photosensors in the X and Y directions.

For example, when coordinates [X:(2), Y:(2)] are detected in the correction area $T_{11}'$, the coordinates [X:(2), Y:(2)] are corrected to be [X(1), Y(1)] according to the correction values X:−2, Y:−2 stored in the correction table. When coordinates [X:(2), Y:(2)] and [X:(1), Y:(2)] are simultaneously detected, coordinates [X:3, Y:(2)] of an intermediate point therebetween are calculated and a correction is accomplished for the coordinate point by use of the corrsponding correction values; as a result, the coordinates thus corrected are attained as [X:(0), Y:(1)], which are inputted as detection coordinate data in a host computer or the like. Silimarly, when coordinates [X:(2), Y:(3)] and [X:(3), Y:(3)] are simultaneously detected, coordinates [X:5, Y:(2)] of an intermediate point therebetween are calculated in the double-precision computation. Since the coordinates are associated with the correction values [X:0, Y:0], the values of the coordinates are directly converted into single-precision coordinates, which are inputted as coordinate input data in a host computer or the like.

As described above, according to the present invention, in a case where input detections are achieved on the adjacent photosensors, an intermediate point therebetween is calculated by the double-precision computation so as to effect the correction depending on the coordinates of the intermediate point; consequently, there are avoided the defects of the coordinate input data appearing on boundaries of areas of the correction table in the prior art technology.

In addition, also for the correction coordinates of the single-precision coordinates, the correction table is established in association with the coordinates calculated by the double-precision computation; consequently, even when the correction table is arbitrarily established, there does not appear the defect in the coordinate input data on boundaries of the correction areas, which enables the parallax taking place with respect to the employed display apparatus to be appropriately altered and hence the associated erroneous data input can be prevented.

Since the correction of the parallax is accomplished with respect to coordinates of an intermediate point obtained by the double-precision computation, even when an input operation is achieved on a boundary of areas of the correction table, the defect of the coordinate data does not occur when the single-precision data is to be outputted.

BRIEF DESCRIPTION OF THE DRAWINGS

The present invention will be apparent from the following detailed description taken in conjunction with the accompanying drawings in which.

DESCRIPTION OF THE PREFERRED EMBODIMENTS

Figure 1:
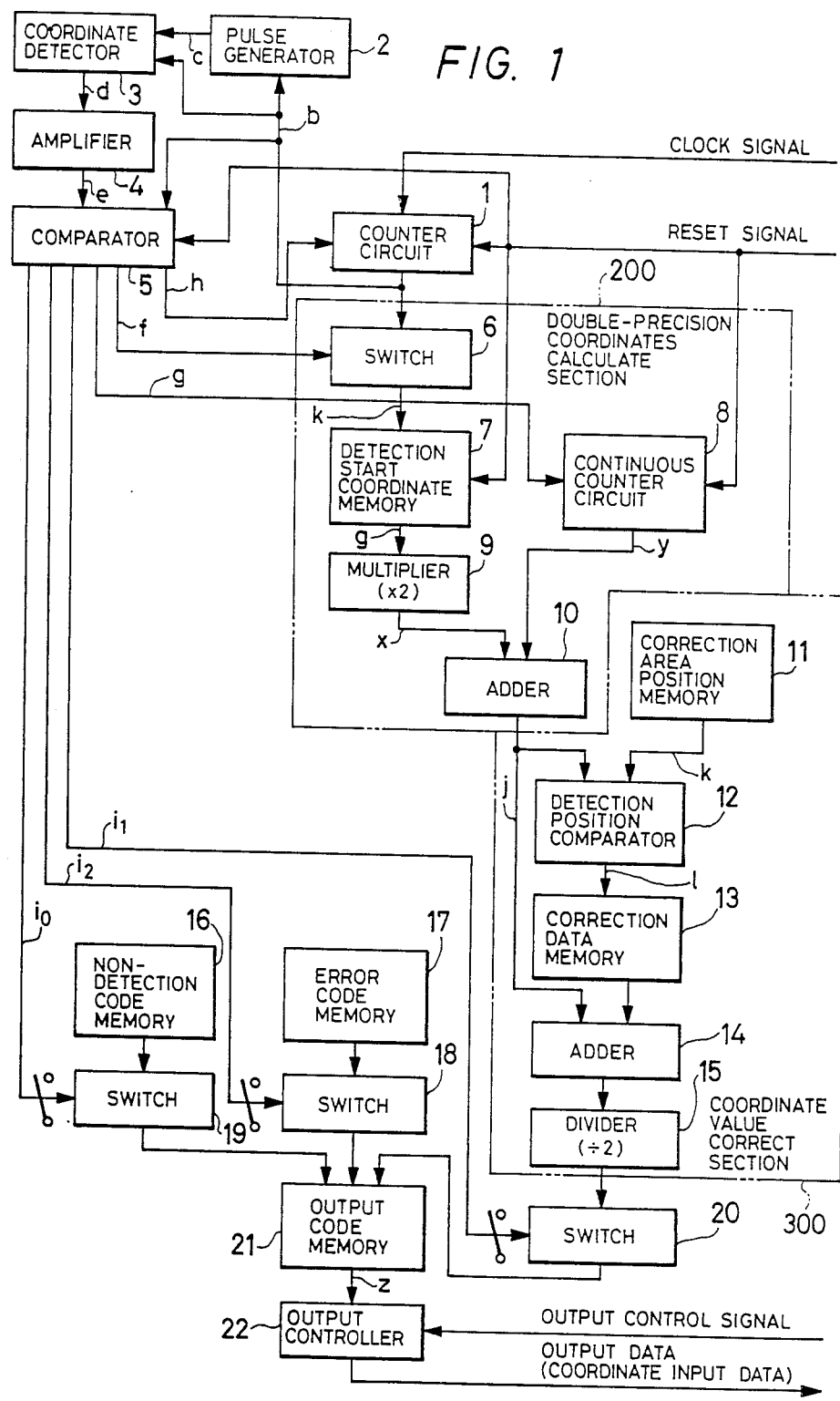
FIG. 1 is a schematic block diagram showing an embodiment of the coordinate input apparatus according to the present invention.

Referring now to the drawings, description will be given of an embodiment according to the present invention.

FIG. 1 is a block diagram useful to explain an embodiment of the coordinate input apparatus according to the present invention which includes a counter 1, a pulse generator 2, a coordinate detecting section 3, an amplifier section 4, a comparator section 5, a change-over swich 6, a detection start coordinate memory 7, a continuous counter circuit 8, a multiplier 9, an adder 10, a correction area position memory 11, a detection position comparator 12, a correction data memory 13, an adder 14, a divider 15, a non-detection code memory 16, an error code memory 17, change-over switches 18–20, an output code memory 21, and an output control section 22. The configuration further comprises a double-precision coordinate computation section 200 including the switch 6, the detection start coordinate memory 7, the continuous counter circuit 8, the multiplier 9, and the adder 10. Furthermore, the system includes a coordinate correction section including the correction area position memory 11, the detection position comparator 12, the correction data memory 13, the adder 14, and the divider 15.

Next, a description will be given of the function of each block of FIG. 1.

The counter 1 is reset by a reset signal RS and increments the count value by one each time a signal on a signal line k is inputted in synchronism with a clock signal CLK.

The pulse generator 2 generates pulses according to the count output from the counter circuit 1.

The coordinate detecting section 3 effects a coordinate detection based on the pulse from the pulse generator 2 and the counter value from the counter circuit 1 and then outputs the result.

The amplifier 4 amplifies a signal from the coordinate detecting section 3, shapes the waveform thereof, and outputs the resultant signal.

The comparator 5 will be described later in conjunction with FIG. 2.

The change-over swtch 6 sends the counter value from the counter circuit to the detection start coordinate memory 7 in response to a signal f.

The contents of the detection start coordinate memory 7 are reset with the reset signal RS. The memory 7 stores the counter value from the counter 1 via the switch 6 and outputs the counter value to the multiplier 9.

The continuous count value of the continuous counter circuit 8 is reset with the reset signal RS. The counter circuit 8 increments the continuous counter value in response to a signal on a signal line g and outputs the continuous counter value to the adder 10.

The multiplier 9 multiplies the data on the signal line g by two and outputs the resultant data.

The adder 10 adds data on signal line x to data on signal line y so as to output the result to the detection position comparator 12 and the adder 14.

The non-detection code memory 16 is beforehand loaded with non-detection codes, which are to be delivered to the switch 19.

The error code memory 17 is beforehand loaded with error codes, which are to be delivered to the switch 18.

The change-over switches 19–20 are responsive to signals from signal lines $i_0$–$i_2$ so as to output one of data signals from the non-detection code memory 16, the error code memory 17, and the divider 15 to the output code memory 21.

The output code memory 21 stores data from the switches 18–20 and ouputs the data to the output controller 22.

The output controller 22 outputs data from the output code memory 21 in response to the output control signal z.

In FIG. 1, the double-precision compute section 200 and the coordinate correct section 300 are each prepared for the X axis and Y axis and the functions thereof are changed over depending on the count value from the counter circuit 1.

In addition, the correction area position memory 11 is beforehand loaded with coordinate positions where corrections are to be effected and the correction values thereof are set to the correction data memory 13.

Although a read-only memory (ROM) is employed for the correction data memory 13, the memory is not limited to an ROM, namely, an ROM (PROM, $E^2$-PROM) in which a rewrite operation is possible may be used; furthermore, an RAM may also be applied thereto.

The detection position comparator 12 compares the data from the correction area position memory 11 with the data from the adder 10 so as to deliver via signal line l from the correction data memaory 13 correction data corresponding to the correction area location.

The correction data memory 13 is responsive to a signal from the signal line l to output the pertinent correction data.

The adder 14 adds the data from the adder 10 to the data from the correction data memory 13 so as to output the result to the switch 20.

Figure 2:
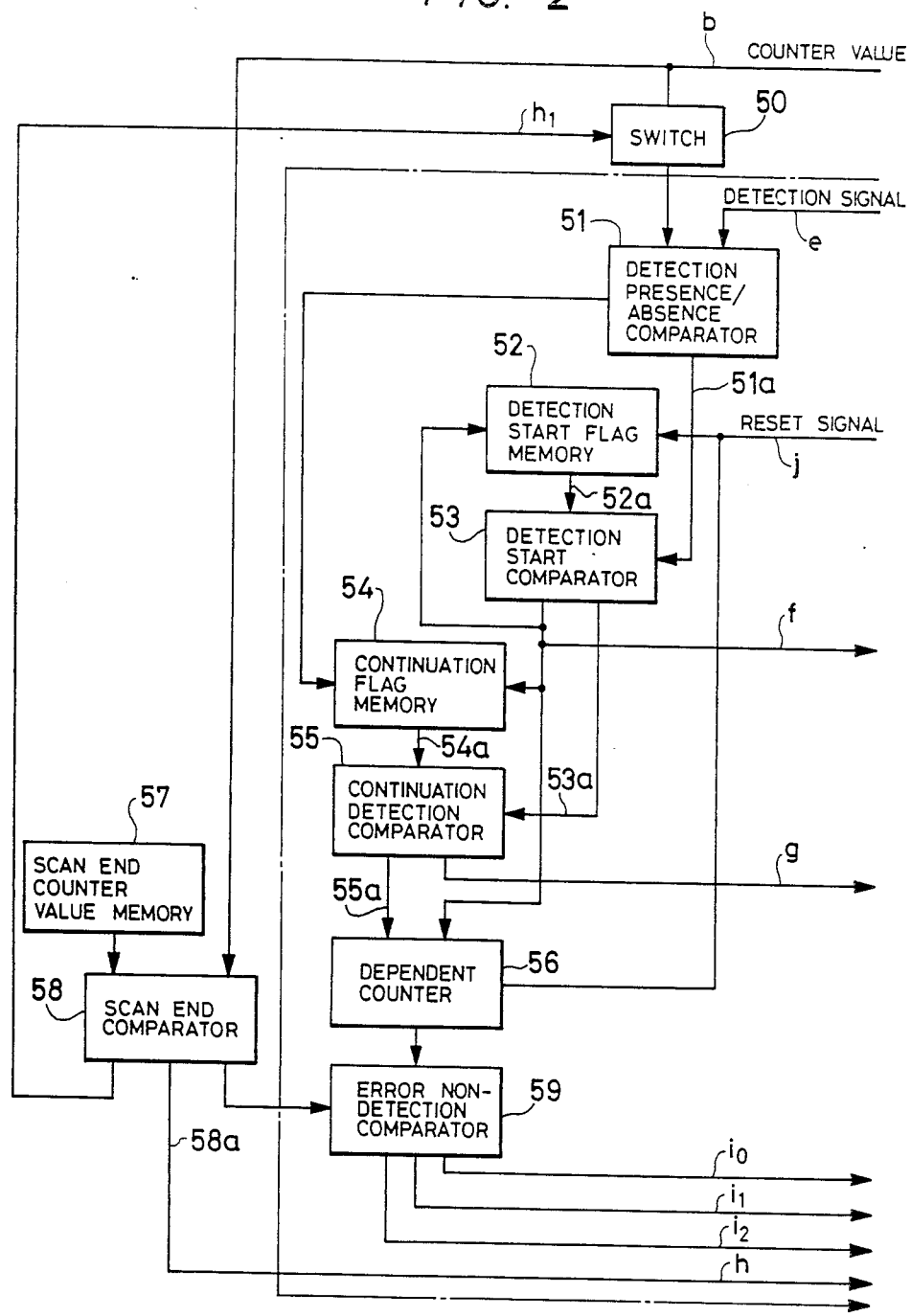
FIG. 2 is a block diagram showing in detail the comparator section of FIG. 1.

FIG. 2 is a detailed block diagram showing the comparator of FIG. 1 which includes a change-over switch 50, a detection presence/absence comparator 51, a detection start flag memory 52, a detection start comparator 53, a continuation flag memory 54, a continuation detection comparator 55, a single counter 56, a scan end counter value memory 57, a scan end comparator 58, and an error non-detection comparator 59.

Next, a description will be given of each block of FIG. 2.

The detection presence/absence comparator 51 determines whether the detection signal has been detected or not.

(i) In a case of non-detection

A signal is transmitted to a signal line to reset the continuation flag 54.

(ii) In a case of detection

A signal is set to a signal line 51a to operate the detection start comparator 53.

The detection start comparator 53 judges the content of the detection start flag 52.

(i) If the detection start flag 52 has been reset (at a first detection)

A signal is transmitted to a signal line f:
to set the detection start flag,
to set the continuation flag,
to increment the content of the single counter by one, and
to operate the switch 6 so as to send the counter value from the counter circuit 1 to the detection start coordinate memory 7.

(ii) If the detection start flag 52 has been set (at the second and subsequent detections)

A signal is sent to a signal line 53a to operate the continuation detection comparator 55.

The continuation detection comparator 55 judges the content of the continuation flag.

(i) If the continuation flag 54 has been reset (detections have been effected at two or more positions apart from each other)

A signal is transmitted to a signal line 55a to increment the content of the single counter 56 by one.

(i) If the continuation flag 54 has been set (detections have been continuously effected)

A signal is transmitted to a signal line g to the continuous counter so as to increment the content thereof by one.

Incidentally, it is assumed that the detection start flag 52 has been reset in advance with a reset signal and that the single counter 56 has been beforehand reset by a reset signal.

Although a description will be later given of the scan end comparator section of FIG. 3 including the scan end counter value memory 57 and the scan end comparator 58, the scan end comparator section has the following functions.

That is, the scan end comparator 58 compares the content of the scan end counter value memory 57 with the counter value so as to judge whether or not the scan has been ended.

(i) In a case where the scan has not been terminated (counter value < scan end counter value)

A signal is transmitted to a signal line h to operate the counter circuit 1 so as to increment the counter value by one.

(ii) In a case where the scan has been terminated (counter value = scan end counter value)

The error non-detection comparator 59 is caused to start its operation.

The error non-detection comparator 59 judges the content of the single counter value 56.

(i) In a case of single counter value = 0 (detection has not been effected)

A signal is sent to a signal line $i_0$ to operate the switch 19 so as to send the content of the non-detection code memory 16 to the output code memory 21.

(ii) In a case of single counter value = 1 (detection has been effected; no error)

A signal is sent to the signal line $i_1$ to operate the switch 19 so as to send the content of the divider 15 to the output code memory 21.

(iii) In a case of single counter value $\geq$ 2 (detections have been effected at two or more positions apart from each other)

A signal is sent to the signal line $i_2$ to operate the switch 19 so as to send the content of the error code memory 17 to the output code memory 21.

Incidentally, the content of the scan end counter value memory has been set in advance.

Figure 3:
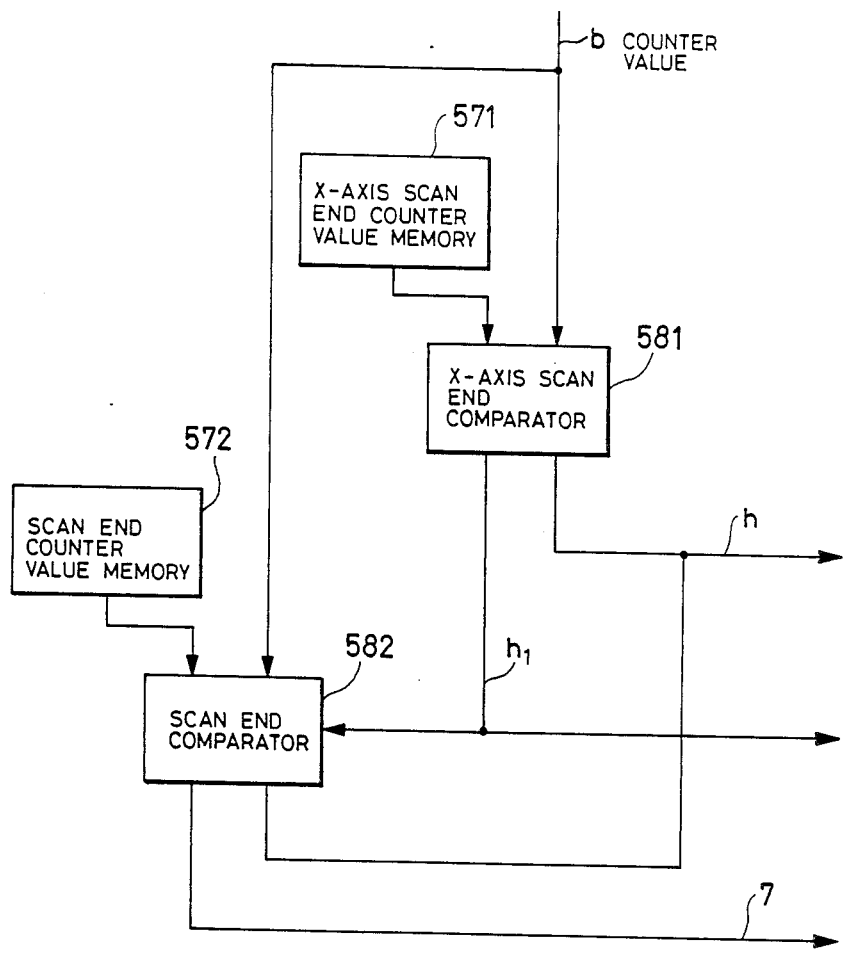
FIG. 3 is a detailed block diagram illustrating the scan end comparator section of FIG. 1.

FIG. 3 is a detailed block diagram showing the scan end comparator section which includes an X-axis scan end counter value memory 571, a scan end counter value memory 572, an X-axis scan end compartor 581, and a scan end comparator 582.

In this figure, the X-axis scan end comparator 581 sends a signal to the signal line h when the content of the counter value is less than the content of the X-axis scan end counter value memory 571; otherwise, a signal is sent to the signal line h₁ to operate the scan end comparator 582 and to cause the switch 50 (FIG. 2) to change over the destination of the counter value from the X-axis block to the Y-axis block.

The scan end comparator 582 sends a signal to the signal line h when the content of the counter value is less than the content of the scan end counter value memory 572. When the contents become to be equal (the scan is finished on the X ans Y axes), a signal is sent to the signal line 7 so as to output from the error non-detection comparator 59 (for the X and Y axes) the signal $i_0$, $i_1$, or $i_2$ corresponding to the value of the single counter 56 (FIG. 2).

Figure 4:
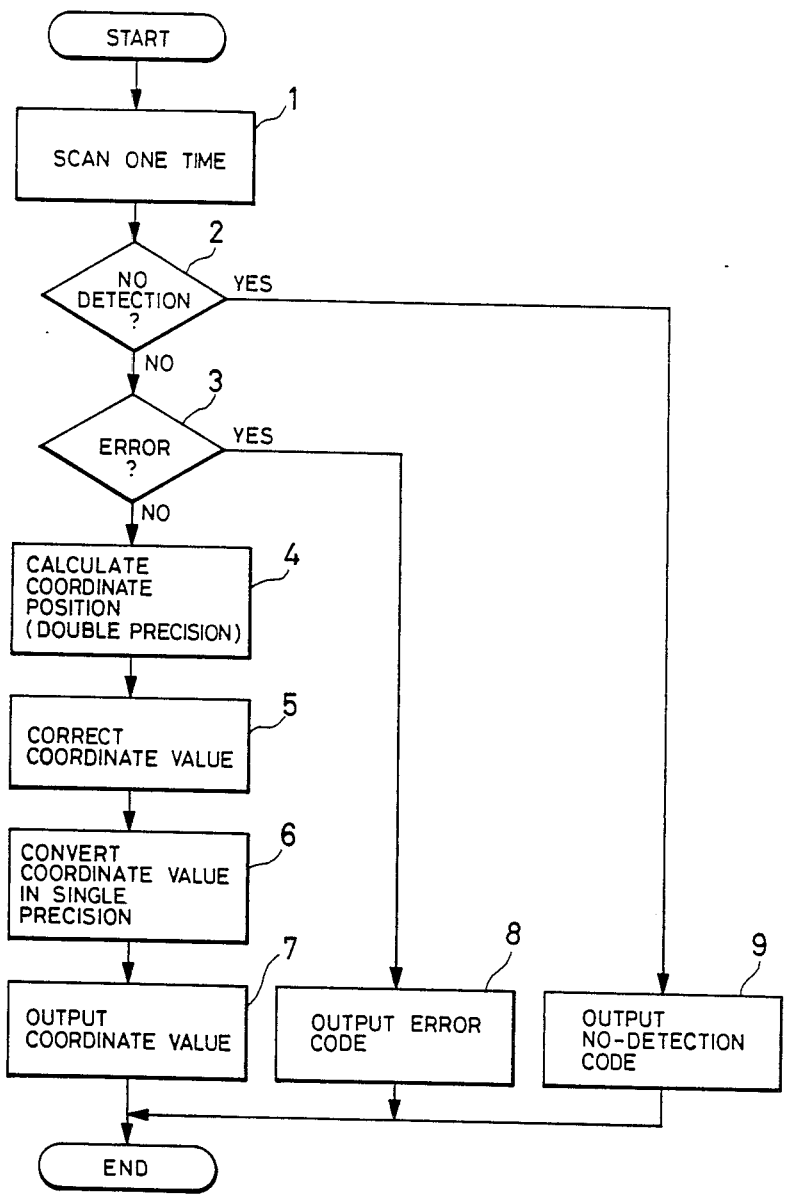
FIG. 4 is a flowchart for explaining the operation of the present invention.

FIG. 4 is a flowchart useful to explain the operation of the coordinate input apparatus according to the present invention.

In FIG. 4, according to the result of the scan of step 1, it is judged whether or not an input detection has been accomplished (step 2). When the detection has been effected, it is judged whether or not an error results (step 3). For a normal input detection, the coordinate position is computed in the double precision (step 4). The double-precision calculation is achieved by the double-precision compute section 200 of FIG. 2.

Figure 5:
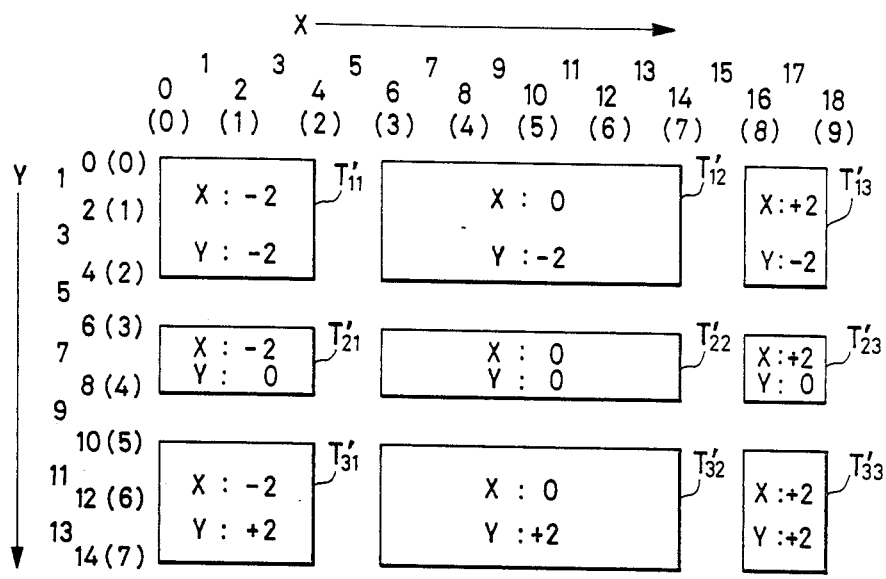
FIG. 5 is an explanatory diagram useful to explain an example of the correction table according to the present invention.
Figure 7:
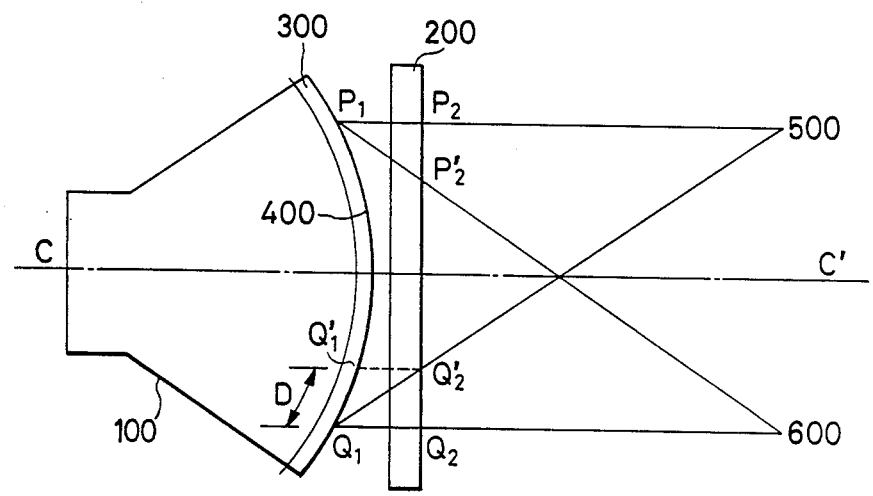
FIG. 7 is an explanatory diagram for explaining a mechanism of an occurrence of a parllax in a coordinate input apparatus.
Figure 6:
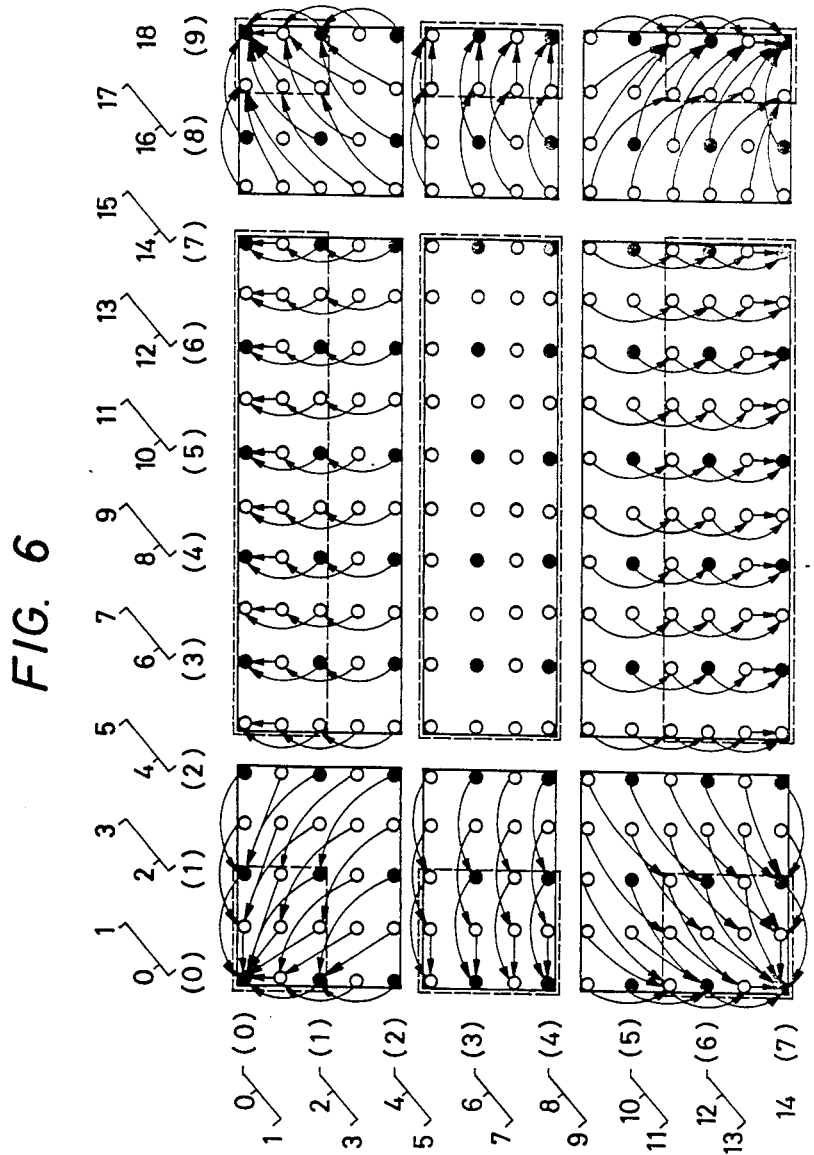
FIG. 6 is an explanatory diagram for explaining the principle of the correction according to the present invention.
Figure 8:
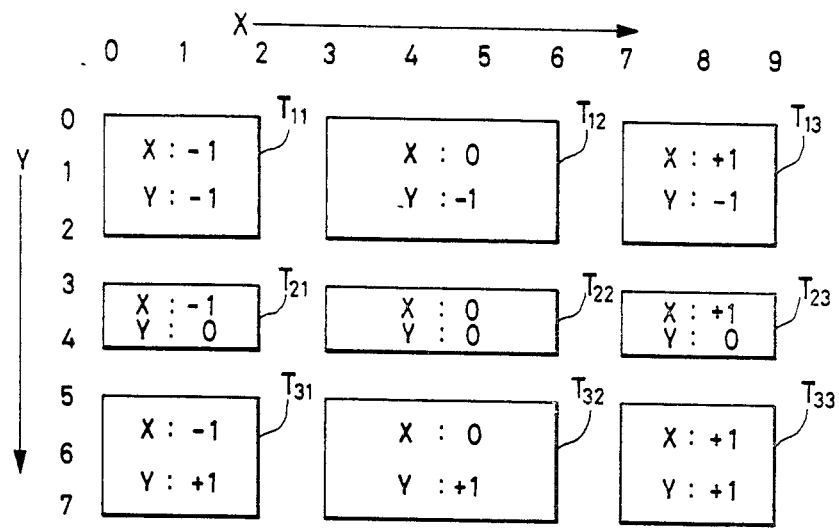
FIG. 8 is an explanatory diagram useful to explain an example of the correction table in the prior art technology.
Figure 9:
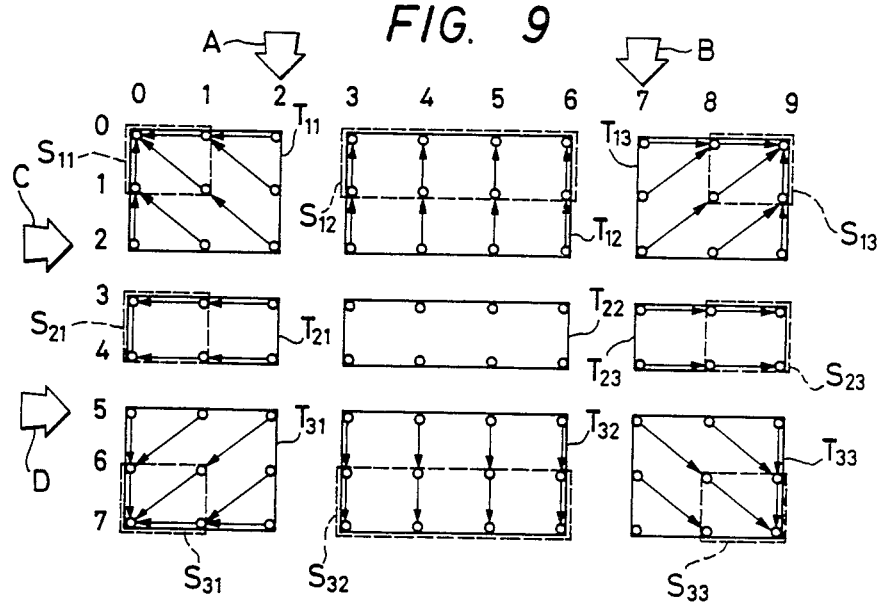
FIG. 9 is an explanatory diagram for explaining the principle of the correction according to the prior art technology.

The coordinate values thus attained by the double-precision computation are processed in the coordinate value correction section 300 of FIG. 1 such that correction data corresponding to the correction area of the correction area position memaory 11 is read from the correction data memory 13 and that the detected coordinate values are added to the coordinate values above in the adder 14, thereby achieving the correction associated with the parallax (step 5). The principle of the correction is identical to that described in conjunction with FIGS. 5-6.

The coordinate values thus corrected are divided by two by the divider 15 of FIG. 1 so as to be converted into coordinate values in the single precision (step 6). The conversion of the coordinate values into the single-precision values is executed, as shown in FIG., 6 such that the double-precision coordinate values 0-1, 2-3, 4-5, 6-7, etc. are respectively related to the single-precision coordinate value (0), (1), (2), (3), etc.

The coordinate values thus obtained in the single precision are delivered as coordinate input data via the output code memory 21 and the output controller 22, as shown in FIG. 1, to a host computer or the like (step 7).

On the other hand, when the input detection is missing in the step 2, a non-detection code is outputted from the non-detection code memory 16 of FIG. 1 (step 9).

Furthermore, when an error input is found in the step 3, an error code is delivered from the error code memory 17 of FIG. 1 (step 8).

Through the operations above, the double-precision computation is accomplished for the input coordinate position detected so as to calculate the coordinates of the intermediate point, a correction is achieved on the resultant data with the correction values set to the correction table, and then the obtained values are converted again into single-precision values, thereby avoiding the defects of the coordinate data in the physical coordinate values.

As described above, according to the present invention, the defects of the input data occurring on boundaries of areas when the parallax correction values are set for the respective areas corresponding to the positions between the display apparaus and the coordinate input apparatus, which consequently removes the drawback of the prior art technology and provides a coordinate input apparatus having an efficient performance.

While the present invention has been described with reference to the particular illustrative embodiments, it is not restricted by those embodiments but only by the appended claims. It is to be appreciated that those skilled in the art can change and modify the embodiments without departing from the scope and spirit of the present invention.

What is claimed is:

1. A coordinate input apparatus in which light sources and light receiving elements opposing thereto with an input operation space therebetween are arranged in an X-axis direction and in an Y-axis direction, said light sources and said light receiving elements forming a plurality of pairs, said light sources are sequentially driven to accomplish a scan operation, coordinates corresponding to said light receiving element of which a light path is interrupted by a coordinate input scan in said input operation space are outputted as detection signals and as coordinate input data of a position where the light path is interrupted comprising:

double-precision coordinate calculate means for calculating, when light paths of two adjacent light receiving elements are simultaneously interrupted, coordinates of an intermediate point associated with coordinates corresponding to said two light receiving elements and coordinate value correct means for achieving a parallax correction on the coordinates calculated by said double-precision calculate means by use of a correction table wherein an output from said coordinate correct means is restored to be coordinates corresponding to said arrangement constituted with the light sources and said light receiving elements so as to be outputted as coordinate input data.

2. A coordinate input apparatus according to claim 1 wherein each said light sources is a photoemitter.

3. A coordinate input apparatus according to claim 1 wherein each said light receiving elements is a photosensor.

4. A coordinate input apparatus according to claim 1 wherein said duble-precision coordinate calculate means includes change-over switch means, detection start coordinate memory means, continuous counter circuit means, multiplier means, and adder means.

5. A coordinate input apparatus according to claim 1 wherein said coordinate value correct means includes correction area position memory means, detection position comparator means, correction data memory means, adder means, and divider means.

* * * * *